May 1, 1956  A. F. TEXTOR  2,743,737
SAFETY VALVE FOR TANKS
Filed Nov. 24, 1954
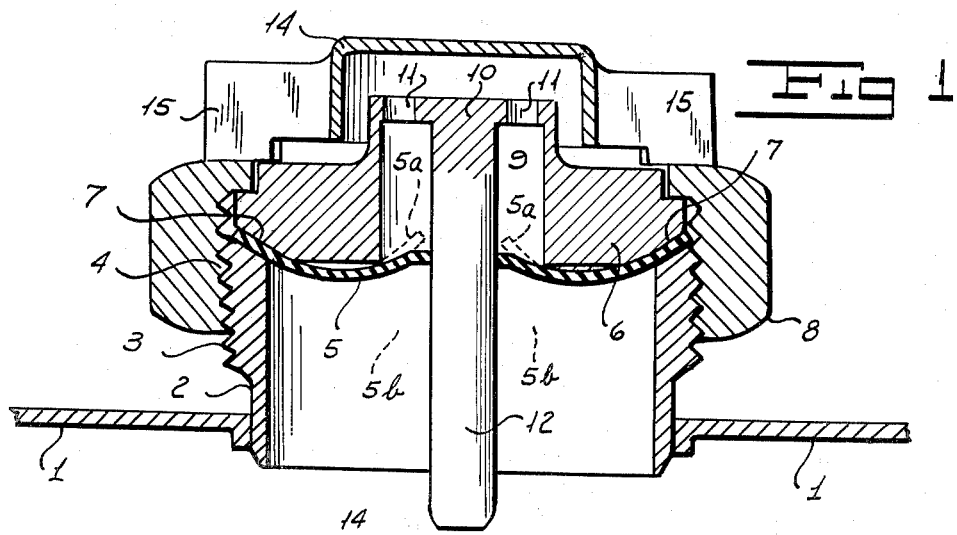
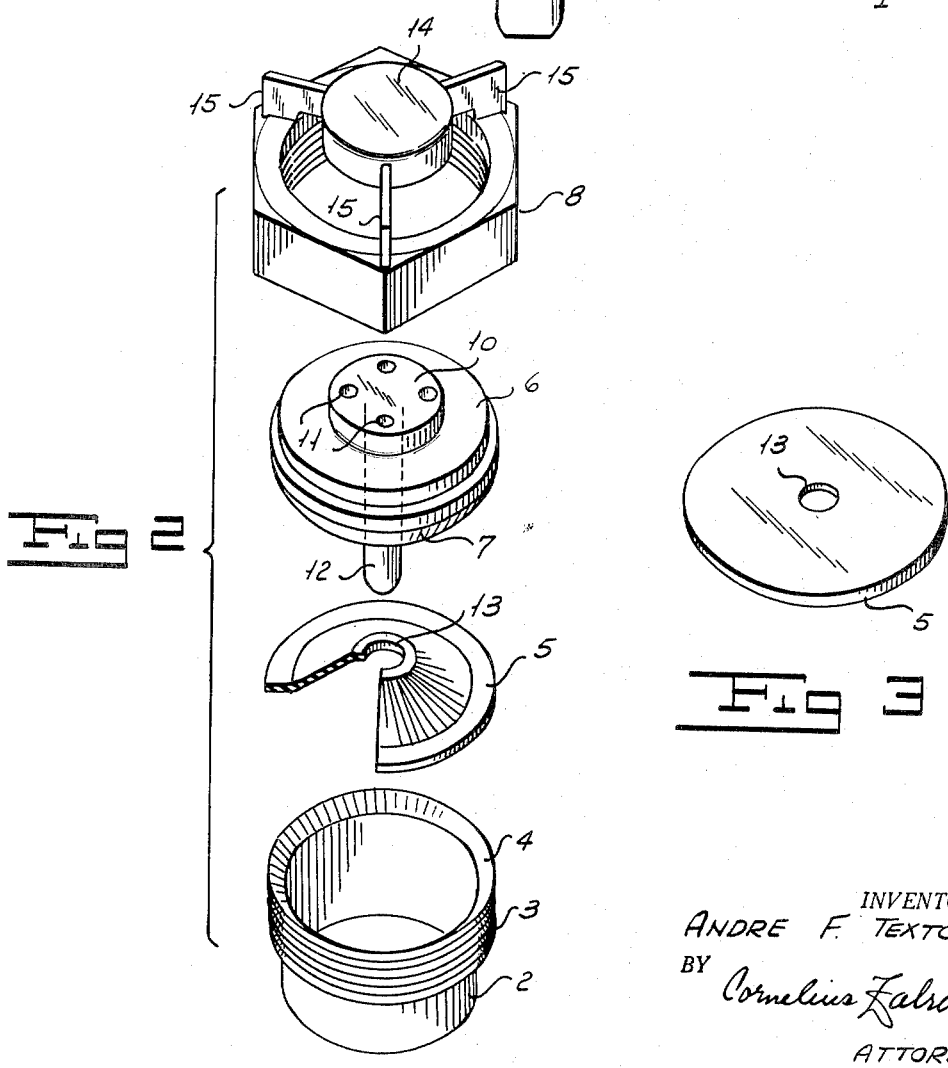
INVENTOR.
ANDRE F. TEXTOR
BY
ATTORNEY

United States Patent Office 2,743,737
Patented May 1, 1956

2,743,737

SAFETY VALVE FOR TANKS

Andre F. Textor, Sussex, N. J.

Application November 24, 1954, Serial No. 470,971

9 Claims. (Cl. 137—493)

This invention is a safety valve and, while adapted for use on tanks of various kinds, is particularly intended for employment on the tanks of tank trucks such as commonly used for the transportation of bulk milk from the creamery to industrial or retail markets.

The tank of each such milk truck is provided at or near its bottom with a valved connection through which the milk is pumped into the tank at the creamery and withdrawn at destination by a suction pump. As the milk enters the tank at the creamery, it compresses the air present in the tank and this air must be allowed to escape. As the milk is withdrawn, the tank must be vented in order that the liquid may be displaced by air permitted to enter the tank. Such venting of the tank is essential for the reason that these tanks are commonly fabricated from stainless steel of relatively light gauge so as to minimize their weight. They will withstand appreciable internal pressure but are not particularly resistant to collapse if the internal pressure drops below the external atmospheric pressure.

It is therefore the practice when filling or emptying the tank, to at least partially open the manhole which is provided at the top of the tank although in some cases relief valves have been provided for venting purposes. These valves, however, have generally been of a complicated nature and not infrequently become clogged or fail to operate properly. Such failure precludes the entrance of air into the tank during withdrawal of the milk, with the result that the tank is apt to collapse under external air pressure. It is extremely difficult to repair a tank which has collapsed from this cause, so as to restore it to its original shape and condition and in many instances it has been found expedient to scrap such a tank with resulting appreciable monetary loss.

With the foregoing considerations in mind, the primary object of the present invention is to provide a safety valve of extreme simplicity, unfailing in its operation and one which will require practically no maintenance over protracted periods.

A further object of the invention is to provide a valve of the character described which may be dismantled without the use of special tools to permit it to be readily cleaned and sterilized.

Another object of the invention is to provide a valve which requires no adjustment but which, on the contrary, will operate with high efficiency when associated with the tank of any truck to permit the release of pressure in the tank and to allow of the entrance of air during withdrawal of the milk, and which will at all times preclude the spilling of the milk through such valve.

A further object of the invention is to provide a valve which will have absolutely no moving parts except a flexible diaphragm which normally occupies a position to seal the tank against leakage and against the entrance of extraneous liquids or solids, so that the tank may be maintained in sealed sterilized condition during transportation of the milk on the highway.

Speaking generally, the valve of the present invention comprises a walled passage, which may be associated with the manhole of the tank or directly with the top wall of the tank. Across that passage, after the manner of a partition, extends a flexible resilient diaphragm, the periphery of which has sealed connection with the wall of the passage. Said diaphragm has a perforation spaced from its periphery and through the perforation extends a fixed post. The perforation in the diaphragm normally tightly embraces the post but, because of the resilient and flexible character of the diaphragm, differential pressures exerted at the opposite sides thereof will cause the diaphragm to be distended coaxially of the post in one direction or the other, as the case may be, to such extent as to enlarge the opening in the diaphragm sufficiently to free it from contact with the post and permit of substantial equalization of the pressures at the opposite sides of the diaphragm. Minus pressures within the tank will thus draw the diaphragm inwardly to permit the entrance of air into the tank while excessive pressure within the tank will distend the diaphragm in an upward direction to relieve such pressure. By making the diaphragm of appropriate thickness, depending upon the conditions desired, the differential pressures under which it is operable may be controlled, so as to insure normal closure of the passage against the spilling of milk without interfering with the proper functioning of the diaphragm to maintain the desired conditions of pressure in the tank.

Features of the invention, other than those adverted to, will be apparent from the hereinafter detailed description and appended claims, when read in conjunction with the accompanying drawings.

The accompanying drawings illustrate one practical embodiment of the invention, but the construction therein shown is to be understood as illustrative, only, and not as defining the limits of the invention.

Fig. 1 shows a safety valve embodying the present invention in central section and associated with the body or manhole of a tank which is shown in this figure in fragmental section.

Fig. 2 is an exploded view showing the several parts of the valve dismantled and in perspective.

Fig. 3 shows a modified form of diaphragm which may be used.

Referring to the drawings, 1 designates a portion of a tank or of the manhole cover thereof. Rigidly mounted on the part 1 is a tubular nipple 2 externally threaded as shown at 3. The upper edge of this nipple forms a seat 4 which is preferably of frusto-conical form and on this seat is adapted to rest the periphery of a diaphragm 5. A clamping disk 6, a marginal seat portion 7 of which is made of complementary frusto-conical form, is adapted to rest upon the margin of the diaphragm and be drawn in the direction of the nipple by means of a nut 8 which cooperates with the threaded portion 3 of the nipple, to clamp the margin of the diaphragm tightly between the seats 4 and 7 and form therewith a hermetic seal.

The central portion of the clamping disk 6 is recessed as at 9 and the top of this chamber is closed by a wall 10 having vent holes 11. This wall 10 is provided with a centrally disposed post 12, rigid with the clamping disk 6, and extending downwardly through the recess 9 and through a perforation 13 in the center of the diaphragm 5. The diaphragm is of resilient flexible material and the perforation 13 thereof is made of slightly smaller diameter than the diameter of the post 12 so that the wall of the perforation 10 in said diaphragm will elastically grip and hug the post and normally provide therewith a substantial hermetic seal.

However, if excess pressure is built up within the tank, such pressure against the under side of the diaphragm will cause the diaphragm to be distended upwardly, as indicated at 5a in Fig. 1, whereby the perforation 13 will be stretched sufficiently to provide a space between the wall of such perforation and the post and permit the excess pressure to be released through the opening thus provided. Likewise, a partial vacuum, within the tank and below the diaphragm 5, will cause said diaphragm to be distended downwardly as shown at 5b by the external atmospheric pressure and thus open up a space between the edge of the perforation 13 and the post 12 to permit the entrance of air into the tank. In either case the reestablishment of substantial equilibrium between the external and internal pressure will permit the diaphragm to autogenously return to a normal intermediate full line position shown in Fig. 1 to re-establish normal sealing of the tank.

To preclude the entrance of rain or extraneous matter into the recess 9 through the vent holes 11, the nut 8 is preferably provided with a protective hood 14, supported on rigid brackets 15 integral with the hood and nut 8, as best shown in Fig. 2.

The diaphragm 5 may be made of any appropriate shape. In Fig. 2 it is shown of substantially conical form with a flat marginal flange, while in Fig. 3 the entire diaphragm is shown as flat. The present invention is not limited to the particular shape of this diaphragm. It may be made of any suitable material such as natural or synthetic rubber or any appropriate plastic material, the criteria being that it be flexible, stretchable and resilient in order to perform the functions hereinbefore described.

In the structure as shown in Fig. 1 of the drawings, the diameter of the recess 9 is somewhat less than the internal diameter of the nipple 2. With this construction it will require a greater pressure within the tank to open a space between the wall of the perforation 13 and the post to permit exit of air from within the tank than it will require to flex the diaphragm in the opposite direction to permit the entry of air into the tank to displace the milk drawn therefrom. Although the invention is not restricted to this arrangement, it is preferred since it produces a somewhat stronger seal against the spillage of milk through the valve and the tank is well able to stand more internal pressure than external pressure.

The valve of this invention may be readily dismantled by merely unscrewing the nut 8 and lifting out the clamping disk 6 and the diaphragm 5 for thorough cleansing and sterilizing purposes. My valve cannot become clogged or otherwise incapacitated from proper operation and is so simple in construction that wholly uninitiated operators may dismantle and return it to operative condition. When it is used, there is no necessity of removing the manhole cover as the valve will adequately protect the tank from excessive differential pressures.

In the form of the invention shown, the part 8 is in the form of a nut adapted to be screwed to the nipple 2 which is threaded to receive it. The invention is not however limited to a threaded connection between these parts as I may use a bayonet joint or even bolt flanges on the respective parts to one another. In other words, the parts 2 and 8 or their equivalents may be secured together in any appropriate manner without departing from this invention.

The foregoing detailed description sets forth the invention in its preferred practical form but the invention is to be understood as fully commensurate with the appended claims.

Having thus fully described the invention, what I claim as new and desire to secure by Letters Patent is:

1. A safety valve for a tank comprising a tubular threaded nipple having a diaphragm seat, a vented clamping disk overlying said seat and having a complementary diaphragm seat, a flexible resilient diaphragm the peripheral margin of which is interposed between said seats, a nut cooperating with the threads of the nipple to clamp the diaphragm between said seats and form a substantially hermetic seal therewith, and a post rigid with the clamping disk and extending through a perforation in the diaphragm to normally form a hermetic seal therewith, said diaphragm being distendable in opposite directions axially with the post under differential pressures at opposite sides of the diaphragm to enlarge the perforation therein and thereby to break the seal between the post and the diaphragm and permit the passage of air between them.

2. A safety valve according to claim 1, wherein post and perforation are coaxial with one another and with the nipple.

3. A safety valve according to claim 2, wherein the clamping disk has a central chamber contiguous to the diaphragm.

4. A safety valve according to claim 3, wherein the chamber of the clamping disk is less in diameter than the internal diameter of the nipple.

5. A safety valve for a tank comprising a tubular externally threaded nipple, the upper end of which has a diaphragm seat, a centraly perforated flexible resilient diaphragm the peripheral margin of which overlies said seat, a clamping disk overlying said diaphragm and bearing upon the margin of the diaphragm above said seat, a nut coacting with the disk and the threads of the nipple to clamp the margin of the diaphragm between the disk and seat, a central recess in the under side of said disk with vent holes in the top wall of said recess, and a post rigid with said top wall and extending downwardly through the central perforation of the diaphragm which normally elastically grips said post, said diaphragm being distendable in opposite directions axially along the post under differential pressures at opposite sides of the diaphragm to enlarge the perforation therein and thereby to break the seal between the post and the diaphragm and permit the passage of air between them.

6. A safety valve according to claim 5, comprising a hood supported on the nut and overlying the vent holes in the wall of the recess to preclude the entrance of extraneous matter into said vent holes.

7. A safety valve according to claim 6, wherein the recess is of less diameter than the internal diameter of the nipple.

8. A safety valve for tanks comprising a walled passage, a flexible resilient diaphragm extending across that passage and peripherally anchored at a predetermined point in the length of the passage and provided in spaced relation to its periphery with a perforation, and a stationary post rigid with the wall of the passage and extending longitudinally of the passage and through the perforation in the diaphragm and tightly conforming to and fitting said perforation around the entire periphery of said post to normally produce a hermetic seal between the diaphragm and the post, said diaphragm being distendable in opposite directions axially along the stationary post under differential pressures at opposite sides of the diaphragm to stretch and thus enlarge the perforation therein and thereby to break the seal between the post and the diaphragm to permit the passage of air through the opening thereby formed between them.

9. A safety valve according to claim 8, wherein the perforation in the diaphragm is located centrally thereof.

References Cited in the file of this patent

UNITED STATES PATENTS

| | | |
|---|---|---|
| 1,673,751 | Lawrence | June 12, 1928 |
| 2,368,744 | Carey | Feb. 6, 1945 |

FOREIGN PATENTS

| | | |
|---|---|---|
| 823,381 | Germany | Dec. 3, 1951 |